United States Patent [19]

Rubins

[11] 4,083,449
[45] Apr. 11, 1978

[54] REEL CONTAINER
[75] Inventor: Harry L. Rubins, Saratoga, Calif.
[73] Assignee: Ampex Corporation, Redwood City, Calif.
[21] Appl. No.: 654,297
[22] Filed: Feb. 2, 1976
[51] Int. Cl.² ............................................. B65D 85/67
[52] U.S. Cl. ..................................... 206/405; 220/298
[58] Field of Search ............... 206/405, 403, 404, 406, 206/389; 220/298, 327, 328, 325

[56] References Cited
U.S. PATENT DOCUMENTS

| 2,627,997 | 2/1953 | Wittenberg | 220/298 |
| 2,859,868 | 11/1958 | Jaworski et al. | 206/405 |
| 3,138,250 | 6/1964 | Burgess et al. | 206/406 |
| 3,297,153 | 1/1967 | Fattori | 206/403 |

Primary Examiner—William T. Dixson, Jr.
Attorney, Agent, or Firm—Charles M. Carman, Jr.

[57] ABSTRACT

A magnetic tape reel container, of the type having centered cover and bottom arbor means loosely impaling the hub of the reel, is provided with a manually rotatable locking key member mounted on the cover and projecting into keyhole and ward openings in the bottom arbor portion, the bits of the key member being arranged to engage cam ramps within the wards upon rotation to the closed and locked positions, where notches are provided in the cam ramps to secure the key bits; and a resiliently deformable ring is mounted between the arbor portions to load the bits against removal from the notches.

10 Claims, 5 Drawing Figures

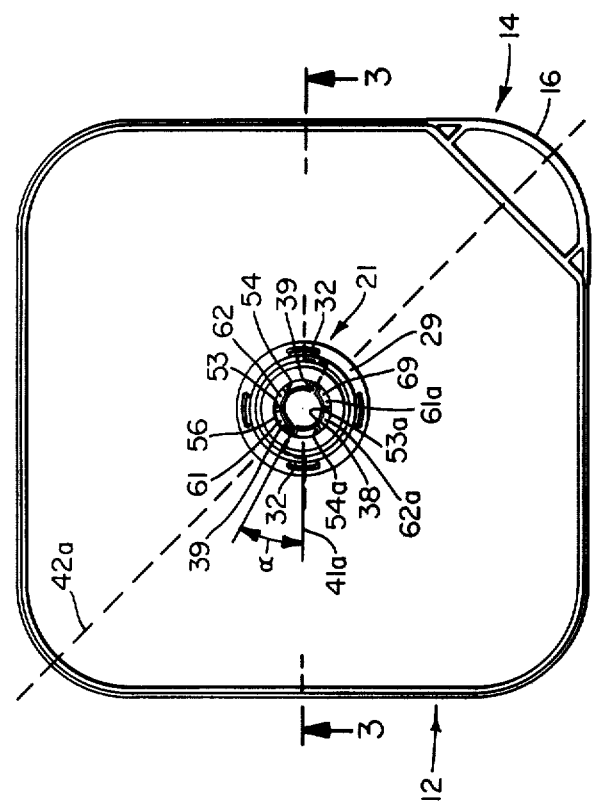
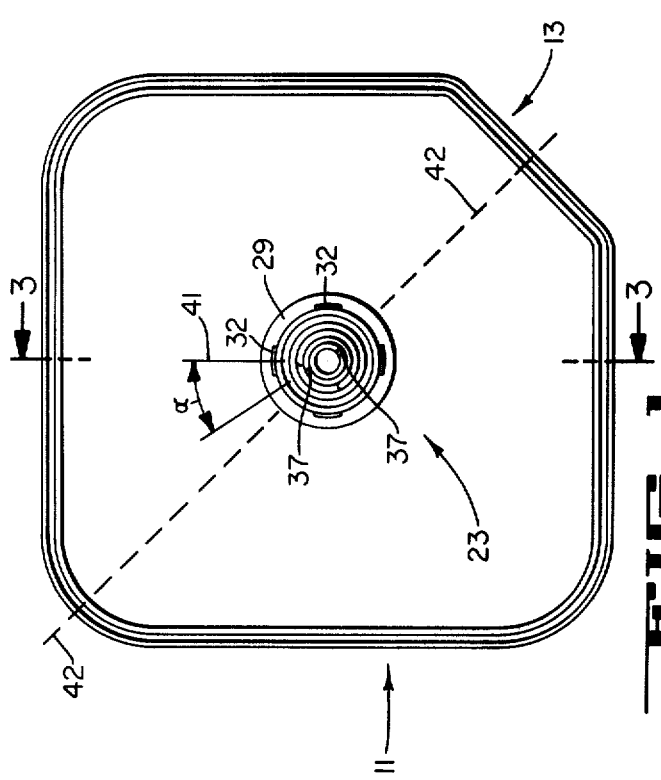
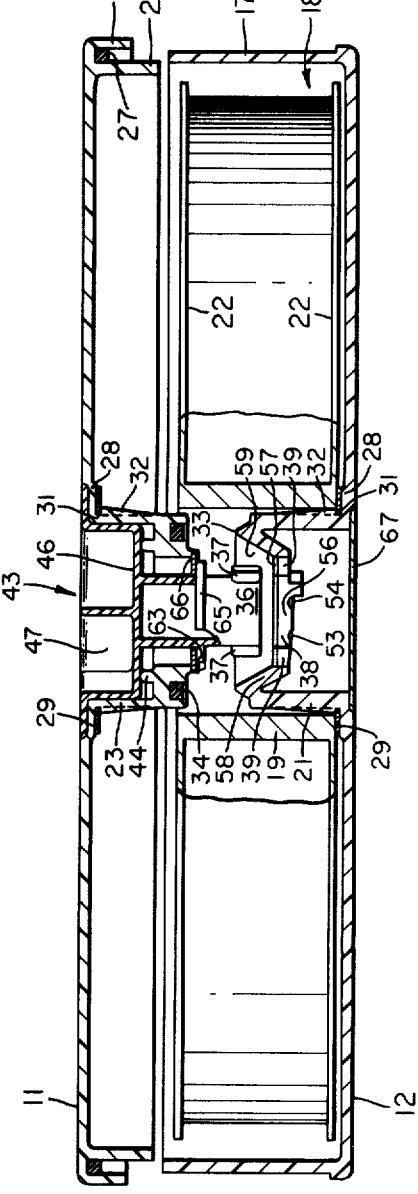
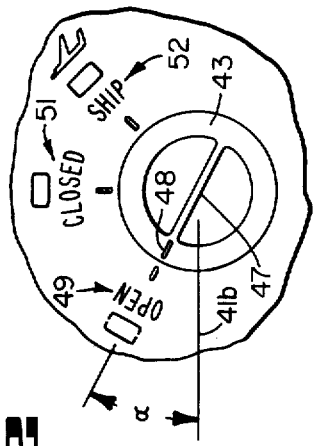
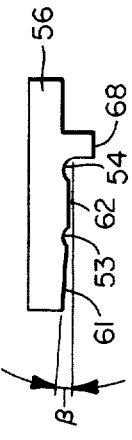

REEL CONTAINER

BACKGROUND OF THE INVENTION

This invention relates to magnetic tape reel containers, and particularly to such containers having central arbors to support the reel and locking means therefor.

In the reel container art, it is usual to support the reel inside the container by means of an arbor impaling the reel hub and extending from the bottom or bottom and cover portions of the container. In many containers the closing and locking means is mounted on the two arbos and secures them together. Such locking means may use screw-down, cam or key-type means to urge the arbors together in pinching relation against the reel to secure the reel against rotation within the container during handling or transportation. Recently, it has been discovered that reels not free to rotate with the containers often react to external shocks such as may arise from being dropped or suddenly stopped, by having the tape packs on the reels locally "cinch" or double-up in damaging discontinuities. It has been found that older containers and cannisters such as were used in the early days of the tape and film industries were not subject to the production of tape cinches fo the reason that within such containers the reels are free to rotate with the tape packs when subjected to translational deceleration. In some examples, anti-friction sleeves and washers have been inserted between the reel and container to aid the rotational process.

With or without such anti-friction means however, there is a problem associated with the locking apparatus in containers that are meant to allow free rotation of the reel. Such locks are usually of one cam type or another, using threaded screws and bolts or rotating keys and cammed wards to draw the two container portions together in a springy relation to load the cam means against easy release. The type of container that pinches and secures the reel could rely upon the compression springiness of the reel itself to provide this security. However, in loosely journalling containers, this solution is not possible; in such containers springs are usually inserted within the wards to load the locking means. However, the manufacture of such locking means is complex and expensive. Alternatively, reliance may be had on the springiness of the container top and bottom walls; but usually this is unsatisfactory because such loading can be accidently relieved by blows or shocks upon the container exterior.

To solve this problem without the provision of expensive spring elements within the wards, the present invention envisions placing a springy rubber gasket ring between the two arbor portions of the container, loading a simple key and cam-ramp locking structure against accidental shock dislodgement, and still leaving the arbor and container walls only loosely engaging the reel, so as to permit free rotation thereof and the avoiding of cinching of the tape under shock deceleration.

Accordingly, it is an object of the present invention to provide a tape reel container avoiding cinching of the tape and having secure and inexpensive closing and locking means.

BRIEF DESCRIPTION OF THE INVENTION

This and other objects of the invention are attained by means of a magnetic tape reel container, of the type having centered cover and bottom arbor means loosely impaling the hub of the reel, provided with a manually rotatable locking key member mounted on the cover and projecting into keyhole and ward openings in the bottom arbor portion, the bits of the key member being arranged to engage cam ramps within the wards upon rotation to the closed and locked positions, where notches are provided in the cam ramps to secure the key bits; and a resiliently deformable ring is mounted between the arbor portions to load the bits against removal from the notches.

BRIEF DESCRIPTION OF THE DRAWINGS

FIG. 1 is an inside plan view of a tape reel container cover member according to the invention;

FIG. 2 is an inside plan view of the container bottom portion;

FIG. 3 is an enlarged sectional view of the cover and bottom in exploded relation, and containing a reel, the view of each portion being taken along the plane of lines 3—3 of FIGS. 1 and 2, respectively;

FIG. 4 is an outside plan view, in enlarged and fragmented form, of a portion of the lock means shown in FIG. 1; and FIG. 5 is an enlarged schematic view illustrating a portion of the locking means shown in FIG. 3.

DETAILED DESCRIPTION

Referring now to the drawing and particularly to FIGS. 1 and 2 thereof, there is shown a tape reel container comprising a cover portion 11 (FIG. 1) and a bottom portion 12 (FIG. 2). Both portions are also shown in FIG. 3. The cover 11 is viewed in FIG. 1 from the inside, that is, from beneath as shown in FIG. 3; while the bottom 12 is seen in FIG. 2 also from the inside, that is, from above as shown in FIG. 3. The two portions are generally rectangular in outline, with rounded corners, except that one corner 13, 14 of each portion is diagonally truncated so that the two portions can be fitted together in only one orientation, for reasons to be later explained. Conveniently, also, a handle 16 is formed on the truncated portion 14 of bottom portion 12.

ROTATION OF THE REEL

The bottom 12 has a side wall 17 dimensioned for loosely containing a tape reel 18 (FIG. 3), the hub 19 of which fits loosely upon a central arbor portion 21. To assist in fitting and seating the hub 19, the arbor 21 is slightly conically tapered converging inwardly. To avoid the problem of tape pack cinching, as above explained, it is ensured that the reel 18 has the greatest possible freedom to rotate within the bottom 12; i.e., the side wall 17 is spaced sufficiently far from the arbor 21 that the reel flanges 22 can never touch the side wall 17. Thus, of possible frictional forces opposing reel rotation that might be engendered by the arboe 21 or the side wall 17, that of the arbor is given preference and that of the side wall is completely obviated; in other words, the force that is applied with the shortest moment arm is selected, and the minimum anti-rotational moment is ensured.

The cover 11 also has a central tapered arbor 23 fitting loosely within the reel hub 19, and a side wall 24 fitting loosely within the bottom side wall 17. This side wall 24 is dimensioned to extend axially within the bottom side wall 17 to a point below the upper reel flange 22 in the container-closed condition, but is spaced radially from the arbor 23 so that the flange 22 can never touch the side wall 24, just as with arbor 21 and side wall 17. A skirting outer side wall 26 is also provided, extending axially from the cover 11 for a lesser distance than the side wall 24, so as to enable the more convenient fitting of the cover upon the bottom. This skirt wall 26 is spaced radially outwardly from the wall 24 for a dimension substantially greater than the thickness of wall 17, so as to fit loosely around wall 17 in the closed position. The radial looseness of fit between the walls 17, 24 and 26 enables the fitting of the two parts together more easily; but to ensure a tight closing between these parts, and to seal the container against outside air and moisture, a compressible sealing gasket 27 is fitted between the walls 26, 27. When the cover 11 is firmly seated and locked upon the bottom 12, the axial interior dimension of the container is sufficiently great that the reel can rotate loosely within the container.

Both cover and bottom are provided with a raised thrust bearing portion 28 arranged circumferentially around the base of each respective arbor, and spaced axially apart in the closed condition of the container to only loosely bracket the reel hub and thus allow greatest freedom of rotation. Furthermore, the diameters of the arbors near their bases are selected so that even if the reel is tipped on one (e.g., the lower) thrust bearing portion 28 as far as it may go, the reel flanges 22 will touch neither the top or the bottom walls 11, 12 and only the one (lower) thrust bearing portion 28, thus keeping both frictional force and frictional moment resisting rotation at a minimum.

To further assist rotation of the reel, antifriction washers 29 may also be provided between the reel hub 19 and thrust bearing portions 28. Such washers may be made, for example, of teflon or polyethylene, and are retained in notches 31 formed in fluted portions 32 of the respective arbors.

Locking

It will be understood that, if the reel is to remain loosely journalled upon the arbors 21, 23 and loosely between the washers 289 and/or thrust bearings 28, the locking mechanism must draw the two container halves tightly together without causing pinching engagement of the two thrust bearings against the reel hub. Furthermore, when the container is closed and is being shipped, for example, in a stack of objects includng heavier and smaller diameter objects resting upon the axial portion of the case, the case must be protected against flexing axially inwardly to the extent that either (1) the thrust bearings 28 may pinch the reel and impede rotation, or (2) the locking mechanism may become loosened, resulting in accidental opening and spillage of the contents upon subsequent handling.

Accordingly, the upper portion of the bottom arbor 21 is formed with a circular ridge 33, seating in the closed condition against a ring-shaped resilient gasket 34 that is set into a conforming recess in the cover arbor 23. The gasket 34 may be made, for example, of closed cell silicone foam rubber, which does not lose its resilience under either extended compression or great temperature changes. The locking mechanism itself comprises a manually rotatable key member 36, fitted with integral radially extending bit portions 37, and mounted for rotation in the cover 11 so as to extend into a keyhole opening 38 in the bottom arbor 21; the opening 38 being warded to define ward passages 39 (FIGS. 2, 3) for axial passage of the bits in the container-open position of the lock. This position is illustrated in FIGS. 1-4. In FIG. 1, for instance, the diametrically opposite bits 37 lie at an angle $\alpha$ counter-clockwise from a vertical line 41 in the plane of the cover. If the cover is now rotated 180° about an axis 42 lying in the cover plane and extending from upper left to lower right as seen in the Figure, then the cover will be brought into correct orientation for fitting on the bottom 12 as shown in FIG. 2, upon which the axis 42 is projected for the sake of illustration as a line 42a; but during this rotation, the line 41 is reversed to become a horizontal line, projected for the sake of illustration as a line 41a in FIG. 2, and the angle $\alpha$ is reversed so that the bits 37 now lie at the angle $\alpha$ clockwise from the line 41, but perfectly in line with the ward passages 39 in the bottom which also lie at angle $\alpha$ clockwise from line 41a. This is the only orientation of the cover 11 with respect to the bottom 12 that is permitted by the truncated corners 13, 14 of the parts for effecting closing of the container.

If there is any doubt about correct orientation of the bits 37, before closing, the desired orientation can be determined by inspecting the top of the cover, where the key member 36 terminates in an enlarged head portion 43, restng upon a thrust bearing ring extension 44 of the arbor 23. The head 43 has a recessed central portion 46 bisected by a diametrical wall 47 for grasping with the fingers; and the wall 47 is manufactured to lie along the same diametrical plane as do the bits 37. An index mark 48 (FIG. 4) is provided in prolongation of one end of the wall 47, and points to an "open" index mark 49 on the cover when the bits are aligned in the "open" position, as may be seen by comparing FIG. 2 with FIG. 4, wherein wall 47 lies at the same angle $\alpha$ clockwise from a line 41b in the same axial plane as line 41a.

Also shown in FIG. 4 are two other index marks 51 and 52, for "closed" or "ship", respectively. The angular positions represented by these marks correspond to the angular positions of a pair of notches 53 and 54 (FIGS. 3 and 5), respectively, into which the left bit 37 (of FIG. 3) may fit when the key 36 is turned clockwise to the "closed" or "ship" positions. The notches 53, 54 are formed in a cam ramp 56 formed on the underside of the ward portion 57 of the bottom arbor, in which the keyhole 38 and ward passages 39 are formed. The ward portion 57 is in turn formed as a radially inwardly extending flange from a truncated conical wall 58 that tapers downwardly and convergingly inwardly from the ridge portion 33 of the bottom arbor. The wall 58 defines a downwardly tapering recess 59, which is useful to guide the key 36 into the keyhole 38 when the container is being closed.

As is best shown in FIG. 5, the cam ramp 56 has an initial cam face 61 inclined at an angle $\beta$ to a diametrical plane of the bottom arbor, such that the bit 37 in turning clockwise from "open" position to the "closed" position of notch 53, is forced downwardly (as shown in FIG. 3), loading the ridge 33 into the gasket 34, so as to secure the bit 37 in the notch 53. Further security, as for shipping use, may be provided by turning the key further clockwise until the bit 37 settles into notch 54, with the index 48 aligned with mark 52. The cam ramp 56 may be further inclined between the notches 53, 54, but is here shown as a plateau 62 inducing mo greater loading on the gasket 34 than does the inclined surface 61. The depth of each notch in an actual example is about 0.030 inch, while the (axial) height of the inclined surface 61 is slightly greater, so that the gasket 34 is slightly compressed in the "closed" and "ship" positions of the key. A stop portion 68 is provided on the cam ramp to limit clockwise rotation of the bit 37 at the position of notch 54. A second cam ramp 69 (FIG. 2) is formed on the other half of the bottom arbor, for engagement by the other bit 37; ramp 69 has identical surfaces 61a, 62a and notches 53a and 54a, each diametrically opposite its correspondingly numbered counterpart.

For security and neatness, the key 36 is retained on the cover arbor 23 by means of a split retaining ring 63 fitting between a flange 65 of the key and the lower surface 66 of the cover arbor; and an inset cover 67 is glued or otherwise secured to cover the opening beneath the bottom arbor 21.

Thus, there has been described a magnetic tape reel container, of the type having centered cover and bottom arbor means loosely impaling the hub of the reel, provided with a manufally rotatable locking key member mounted on the cover and projecting into keyhole and ward openings in the bottom arbor portion, the bits of the key member being arranged to engage cam ramps within the wards upon rotation to the closed and locked positions, where notches are provided in the cam ramps to secure the key bits; and a resiliently deformable ring is mounted between the arbor portions to load the bits against removal from the notches.

I claim:

1. In a magnetic tape reel container of the type having parallel flat bottom and cover walls and circumferential side walls, with at least the bottom wall having a centered integral reel-supporting arbor portion projecting inwardly therefrom, and with said walls and arbor portion arranged to loosely retain said reel so as to permit relatively free rotation of said reel with respect to said container when said reel is contained therein, the combination comprising:

a manually operable member centrally mounted for rotation in said cover and having cam follower means projecting radially therefrom;

said bottom arbor portion having a central opening in the inwardly projecting end thereof for receiving said manually operable member, said opening being shaped to provide axial passages for said cam follower means and being defined in part by at least one radially inwardly extending flange presenting a cam ramp for engaging said cam follower means and for causing said cover to be urged toward said bottom arbor portion upon rotation of said member toward a closed position;

said cam ramp having at least one notch for engaging said cam follower means in the closed position; and resiliently deformable means between said cover and said bottom arbor portion for loading said cam follower means against said cam ramp independently of said reel during said rotation and for thereby causing said cam follower means to be retained in said notch in the closed position.

2. The combination in the container recited in claim 1, wherein:

said manually operable member is a key member having at least one bit portion constituting said cam follower means; and said bottom arbor portion is warded to provide said central opening as a keyhole opening and said axial passages as ward passages for said bits.

3. The combination in the container recited in claim 2 and also including:

two diametrically opposed bit portions projecting radially from said manually operable key member on the inward side thereof;

the keyhole opening of said bottom arbor portion being shaped to provide axial ward passages for both of said bit portions and being defined in part by two diametrically opposed flanges extending radially inwardly and presenting two cam ramps for engaging said bit portions; and each of said cam ramps having at least one notch for engaging said bits in the closed position.

4. In a magnetic tape reel container of the type having parallel flat bottom and cover walls and circumferential side walls, with at least the bottom wall having a centered integral reel-supporting arbor portion projecting inwardly therefrom, and with said walls and arbor portion arranged to loosely retain said reel so as to permit relatively free rotation of said reel with respect to said container when said reel is contained therein, the combination comprising:

a manually operable member centrally mounted for rotation in said cover and having cam follower means projecting radially therefrom;

said bottom arbor portion having a central opening in the inwardly projecting end thereof for receiving said manually operable member, said opening being shaped to provide axial passages for said cam follower means and being defined in part by at least one radially inwardly extending flange presenting a cam ramp for engaging said cam follower means and for causng said cover to be urged toward said bottom arbor portion upon rotation of said member toward a closed position;

said cam ramp having at least one notch for engaging said cam follower means in the closed position; and resiliently deformable means between said cover and said bottom arbor portion for loading said cam follower means against said cam ramp independently of said reel during said rotation and for thereby causing said cam follower means to be retained in said notch in the closed position;

said manually operated member being a key member having at least one bit portion constituting said cam follower means;

said bottom arbor portion being warded to provide said central opening as a keyhole opening and said axial passages as ward passages for said bits;

said resiliently deformable means comprising a closed cell silicone foam rubber gasket ring mounted on said cover concentric with said manually operable key member; and said bottom arbor portion having a circular ridge mating with and compressively bearing against said rubber gasket ring in the closed position.

5. The combination in the container recited in claim 4, wherein:

said bottom arbor portion extends inwardly substantially for half the axial dimension of said container, and said cover is provided with a corresponding cover arbor portion in which said rubber ring is set to mate with said circular ridge;

said bottom arbor portion having a truncated downwardly convergingly tapering conical shaped recess within said circular ridge;

said radially inwardly extending flanges of said bottom arbor portion being formed to extend from the conical interior wall of said recess to define said central keyhole opening and said axial ward passages for receiving said manually operable key member and said bits thereof;

said cam ramps being formed on the sides of said flanges axially remote from said cover, and being sloped to urge said cover toward said bottom arbor portion upon rotation of said manually operable key member in a predetermined direction.

6. The combination in the container recited in claim 5, wherein said predetermined direction is clockwise. similarly 7. The combination in the container as recited in claim 5, wherein each cam ramp has two notches, smilarly angularly spaced in each ramp, a first of said notches intermediate the extremities of the ramp corresponding to a closed condition of said container, and a second of said notches corresponding to a locked condition of said container and being located at the limit of rotation of said manually operable key means away from the open position of axial alignment of said bits with said axial ward passages; and said ramps each being provided with a stop portion at said second notch, projecting axially away from said cover, for limiting the rotation of said bits in the locked position.

8. The combination in the container recited in claim 5, wherein said arbor portions are dimensioned to loosely impale said reel mounted therein, and with said bottom and cover loosely bracketing said reel, in the closed and locked conditions of said container, so as to permit unimpeded rotation of said reel upon said arbor portions.

9. The combination in the container recited in claim 8, wherein a pair of rings formed of low-friction material are mounted on said respective arbor portions adjacent the cover and bottom of said container to aid said rotation of said reel.

10. In a magnetic tape reel container of the type having parallel flat bottom and cover walls and circumferential side walls, with at least the bottom wall having a centered integral reel-supporting arbor portion projecting inwardly therefrom and with said walls and arbor portions arranged to loosely retain said reel so as to permit relatively free rotation of said reel with respect to said container when said reel is contained therein, the combination comprising:

a manually operable member centrally mounted for rotation in said cover and having cam follower means projecting radially therefrom;

said bottom arbor portion having a central opening in the inwardly projecting end thereof for receiving said manually operable member, said opening being shaped to provide axial passages for said cam follower means and being defined in part by at least one radially inwardly extending flange presenting a cam ramp for engaging said cam follower means and for causing said cover to be urged toward said bottom arbor portion upon rotation of said member toward a closed position;

said ram ramp having at least one notch for engaging said cam follower means in the closed position; and resiliently deformable means between said cover and said bottom arbor portion for loading said cam follower means against said cam ramp independently of said reel during said rotation and for thereby causing said cam follower means to be retained in said notch in the closed position; said cover and bottom portions of said container being shaped for assembly in only one axial orientation with respect to one another, said orientation corresponding to axial alignment with said cam follower means with said passages in the open condition of said manually operable means said cover and bottom portions assembled.

* * * * *